US005144879A

United States Patent [19]

Alessi

[11] Patent Number: 5,144,879

[45] Date of Patent: Sep. 8, 1992

[54] AUTOMATIC FOOD DISPENSER

[75] Inventor: Marion Alessi, Karlsruhe, Fed. Rep. of Germany

[73] Assignee: T. A. Tecnologie Alimentari srl, Vigevano, Italy

[21] Appl. No.: 776,446

[22] Filed: Oct. 18, 1991

[30] Foreign Application Priority Data

Oct. 26, 1990 [EP] European Pat. Off. ...... 90/120582.3

[51] Int. Cl.[5] .......................... A47J 37/00; H05B 6/68; H05B 6/78

[52] U.S. Cl. .......................................... 99/327; 99/326; 99/335; 99/357; 219/10.55 R; 219/10.55 D; 221/8; 221/150 A

[58] Field of Search .................................. 99/325-328, 99/331-335, 352, 355, 357, 339, 443 R, 451, DIG. 14; 219/10.55 R:10.55 A, 10.55 B, 10.55 D; 221/150 A, 150 R, 150 HC

[56] References Cited

U.S. PATENT DOCUMENTS

| | | | |
|---|---|---|---|
| 3,117,511 | 1/1964 | Everett | 99/357 |
| 3,340,790 | 9/1967 | Simjian | 99/357 |
| 3,343,479 | 9/1967 | Wassberg | 99/326 |
| 3,838,790 | 10/1974 | Naruse | 221/150 HC |
| 3,984,030 | 10/1976 | Morini | 221/150 A |
| 4,246,462 | 1/1981 | Meisel | 219/10.55 R |
| 4,398,651 | 8/1983 | Kumpfer | 221/150 HC |
| 4,441,003 | 4/1984 | Eves, II et al. | 219/10.55 A |
| 4,592,485 | 6/1986 | Anderson et al. | 219/10.55 R |
| 4,671,425 | 6/1987 | Knoll | 99/357 |
| 4,771,913 | 9/1988 | Johndrow et al. | 99/355 |

*Primary Examiner*—Timothy F. Simone
*Attorney, Agent, or Firm*—Spencer, Frank & Schneider

[57] ABSTRACT

An automatic food dispenser for dispensing hot instant meals, particularly pizza, includes a refrigeration chamber and at least one oven. The frozen instant meals are stored in tubular magazines which are disposed on a circle within a rotatable drum-type storage container. The oven includes a horizontally extendable push frame and a push front which forms the oven door. A cooking tray is mounted on the push frame to be raised and lowered in such a manner that, when the oven is opened, the cooking tray is automatically moved upward from a lowered cooking position within the cooking chamber into a loading position and, once the push frame is fully extended, further upward into a discharge position within a discharge chamber accessible to the operator. An instant meal selected by the operator is removed in its frozen state by means of a removal device provided at the underside of the refrigeration chamber from the corresponding tubular magazine and is placed onto the cooking tray which is in the loading position. Then the push front closes, causing the cooking tray to be automatically moved back into the cooking chamber of the oven. At the end of the required thawing and cooking time, the hot instant meal is transported out of the oven by means of the movable cooking tray directly into the discharge chamber.

13 Claims, 12 Drawing Sheets

AUTOMATIC FOOD DISPENSER

CROSS REFERENCE TO RELATED APPLICATION

This application claims the priority of Application Ser. No. EP 90/120,582.3, filed Oct. 26, 1990, in the Federal Republic of Germany, the subject matter of which is incorporated herein by reference.

BACKGROUND OF THE INVENTION

The invention relates to an automatic food dispenser for dispensing hot instant meals, the apparatus including a housing having a front that is provided with operating elements and a refrigeration chamber for storing a supply of refrigerated packaged instant meals. At least one oven, preferably a microwave oven, is disposed underneath the refrigeration chamber and includes a cooking chamber for accommodating a refrigerated instant meal, an oven door provided with an opening mechanism and a movable cooking surface which is mechanically coupled with the oven door. An electromechanical removal device is provided at the underside of the refrigeration chamber to remove an individual instant meal from the refrigeration chamber and move it, with the oven door open, onto the cooking surface. By way of a discharge chamber accessible to the operator, the hot instant meal is discharged to the operator.

Such an automatic dispenser, particularly for dispensing hot pizza and other Italian dishes is disclosed in DE-A1-3,738,708 which originates from the same applicant.

In the prior art apparatus, one or a plurality of refrigerated food portions are removed from the storage container by means of an electromechanical flap mechanism. Due to its own gravity, the food portion then slides over a sloped surface onto a deflection flap which is lowered by means of an electromechanical system when the oven door is opened so that the food disposed thereon slides over a further sloped surface into the interior of the oven. When the heating process is completed, the oven door is opened again and simultaneously the food heating surface which is coupled by way of a mechanism is raised in such a manner that the heated food portion is brought to the discharge chamber over a further sloped sliding surface.

The removal and supply of food portions by means of the electromechanical flap-and-slide system has not found acceptance. It has been found that gravity alone is not sufficient to ensure problem-free transport of the food portions within the automatic dispenser. In particular, the discharge of the heated food solely over sloped sliding surfaces has been found to be fraught with problems since, on the one hand, the hot food portions tend to stick to the food heating surface and, on the other hand, there exists the danger that the sensitive sliding material might be damaged due to an excessive sliding speed which is difficult to control.

The prior art apparatus has the further drawback that only a quite specific product, for example pizza, for only one particular taste can be dispensed. However, the user of a modern automatic dispenser expects to make a selection from various products.

SUMMARY OF THE INVENTION

It is thus an object of the present invention to create an automatic food dispenser for dispensing hot instant meals where the dispenser has an improved mechanism for the removal and transport of refrigerated and hot instant meals and which offers a selection between various dishes.

The solution of this problem is based on an automatic food dispenser of the above-described type. According to the invention, the solution resides in that a drum-type storage container that is rotatable about its vertical rotation axis is provided within the refrigeration chamber and includes a plurality of tubular magazines arranged on a circle each accommodating a stack of refrigerated instant meals; the oven includes a horizontally extendable push frame which has a push front forming the oven door; a cooking tray having a horizontal cooking surface is mounted on the push frame so as to be raised and lowered in such a manner that, when the push frame is extended, the cooking tray is moved upward from a lowered cooking position within the cooking chamber into a loading position outside of the cooking chamber; and, if the push frame is pulled out fully, the cooking tray is moved further upward into a discharge position within the discharge chamber. Additionally, a movable closing member for the refrigeration chamber is provided below the tubular magazines and above the cooking tray when the latter is in the loading position and finally the discharge chamber is disposed behind a discharge opening in the front of the housing.

In the plurality of tubular magazines of the drum-type storage container, different instant meals can be stored in refrigerated or possibly even frozen state. By means of the operating elements provided in the front of the housing, the operator is able to select a certain tubular magazine which is then turned into a predetermined position above the stationary closing member of the refrigeration chamber. At the same time, the oven disposed underneath the refrigeration chamber opens by extending its push frame together with the push front constituting the oven door. The cooking tray disposed on the push frame then moves upward in synchronism with the push frame into a loading position. No later than when the cooking tray has reached its loading position outside of the cooking chamber does the closing member of the refrigeration chamber open and the product removed from the selected tubular magazine travels onto the horizontal cooking surface of the cooking tray. Upon closing of the oven door, the cooking tray move automatically back again into its lowered cooking position within the cooking chamber. At the end of the heating process, the oven door again moves out, with the cooking tray again being moved upward automatically. This time, however, the push frame moves out a little further so that the cooking tray is moved correspondingly farther upward into a discharge position within the discharge chamber. Through the discharge opening provided in the front of the housing, behind which the discharge chamber is disposed, the operator is able to remove the desired hot instant meal directly from the cooking tray.

The configuration of the oven door according to the invention as a horizontally extendable push frame with push front and the arrangement of a cooking tray that is automatically raised on the push frame when the oven door is opened constitutes a simple and reliably operating transporting mechanism for the refrigerated instant meal into the cooking chamber and for the discharge of the hot instant meal. Together with the rotatable drum-type storage container which permits the operator to make a selection from various dishes, the invention provides a structurally simple, reliably operating automatic food dispenser that satisfies the wishes of the operator for the provision of hot instant meals.

In a first embodiment, the removal device includes, as a closing member for the refrigeration chamber, a pivotal closing flap disposed below the circular path of the tubular magazines and above the cooking tray when the latter is in the loading position. With the closing flap open, the desired product slides out of the selected tubular magazine onto the cooking tray.

The automatic food dispenser may include two identical, juxtaposed ovens, with the closing flap then being disposed in the middle between the two ovens and being pivotal to both sides about its center axis. In this case each oven has its own associated discharge chamber and discharge opening. Thus, two operators can be supplied simultaneously with different instant meals. Microwave ovens are particularly suitable since they also thaw frozen foods very quickly and heat them to consumption temperature.

In this embodiment of the automatic food dispenser, the tubular magazines are provided with a support bottom for the associated stack of instant meals, an ejection slot penetrating the support bottom in the circumferential direction and a lateral ejection opening for the ejection of the respective lowermost instant meal. A movable ejector is disposed in the region of the closing flap to engage when in the ejection position, in the ejection slot of one of the tubular magazines. The removal of the respective lowermost instant meal from a tubular magazine is effected by rotation of the drum-type storage container, while the ejector is in the ejection position. Due to the relative movement between the passing tubular magazine and the stationary ejector, the ejector pushes the instant meal to be separated laterally through the ejection opening in the tubular magazine in the direction of the—then still closed—closing flap.

The ejector may be fastened, for example, to a pivot bar that is mounted so as to pivotally move above the closing flap and may slidingly rest on the upper face of the closing flap in such a manner that, if the closing flap is opened, the pivot bar is automatically moved upward from its rest position into the ejection position. Instead of such a passive ejection mechanism whose movement is coupled with the pivotal movement of the closing flap, it is also possible, however, to provide an independently activated ejector.

In a second embodiment of the automatic food dispenser according to the invention, the removal device includes, as its closing member, a sliding door provided in the bottom of the refrigeration chamber and disposed below the tubular magazines and above the cooking tray when the latter is in the loading position. This horizontally movable sliding door opens whenever an instant meal is to be removed from the previously selected tubular magazine and placed onto the cooking tray.

If the bottom of the refrigeration chamber is provided with such a sliding door, the tubular magazines advisably are each equipped with a support bottom for the stack of instant meals, a radially outwardly oriented ejection opening for the ejection of the respective lowermost instant meal and a recess disposed directly above the support bottom and opposite the ejection opening. A movable discharge slide is provided which, when the sliding door is open, engages in the recess of one of the tubular magazines and pushes the lowermost instant meal radially outwardly through its ejection opening. The discharge slide may here be coupled with the sliding door by way of a pull frame so that opening of the sliding door causes the discharge slide to automatically engage in the selected tubular magazine and push out the lowermost instant meal which then drops down due to gravity onto the cooking tray in the loading position.

In order to prevent the laterally discharged instant meal from tipping over the front edge of the support bottom of the tubular magazine, the front edge of the discharge slide—as a modification of the invention—is provided with a pivotally articulated pivot plate which, in its rest position, rests on the bottom of the refrigeration chamber and flips vertically downward only when the sliding door is fully open. In this way it is ensured that the instant meals which form a flat stack in the tubular magazine drop flat onto the cooking tray while maintaining their position parallel to the bottom of the refrigeration chamber.

The proposed automatic food dispenser is particularly suitable for the dispensing of pizza which is customarily round. Advisably, the tubular magazines to store the refrigerated or frozen instant meals also have a round cross section. However, the tubular magazines may also have a rectangular, particularly a square, cross section so as to accommodate, for example, frozen packages of Italian pasta dishes.

As a mechanism for the automatic raising and lowering of the cooking tray during extension of the oven door, a structure has been found acceptable in which the push frame of the oven supports two bearing blocks disposed on the sides, a pivotal lever having a short lever arm and a long lever arm is pivotally mounted in each one of these bearing blocks, the cooking tray is suspended from the ends of the long lever arms in a pendulum fashion and at least one short lever arm cooperates with a stop in such a manner that during extension of the push frame, the pivot lever pivots upward beginning after a certain distance is traversed. This purely mechanical construction has the advantage that it does not require its own drive but couples the movement of the cooking tray with the extension of the push frame. The entire automatic food dispenser is thus able to operate with only three drives, namely a drive for rotating the drum-type storage container, a drive for opening the closing flap at the refrigerated container and a drive for extending the oven door.

In an advantageous modification of the invention, the automatic food dispenser additionally includes at least one cutlery magazine disposed within the housing to accommodate a stack of packaged sets of disposable cutlery and an associated removal slot in the front of the housing. The user of the automatic food dispenser thus receives the suitable cutlery together with the desired hot meal. Advisably an electrically actuated discharge slide is provided at the cutlery magazine to move the lowermost set of disposable cutlery out of the cutlery magazine in the direction of the discharge slot.

BRIEF DESCRIPTION OF THE DRAWINGS

Two embodiments of the invention will now be described in greater detail with reference to the attached drawing FIGURES. It is shown in.

DESCRIPTION OF THE PREFERRED EMBODIMENTS

Figure 1:
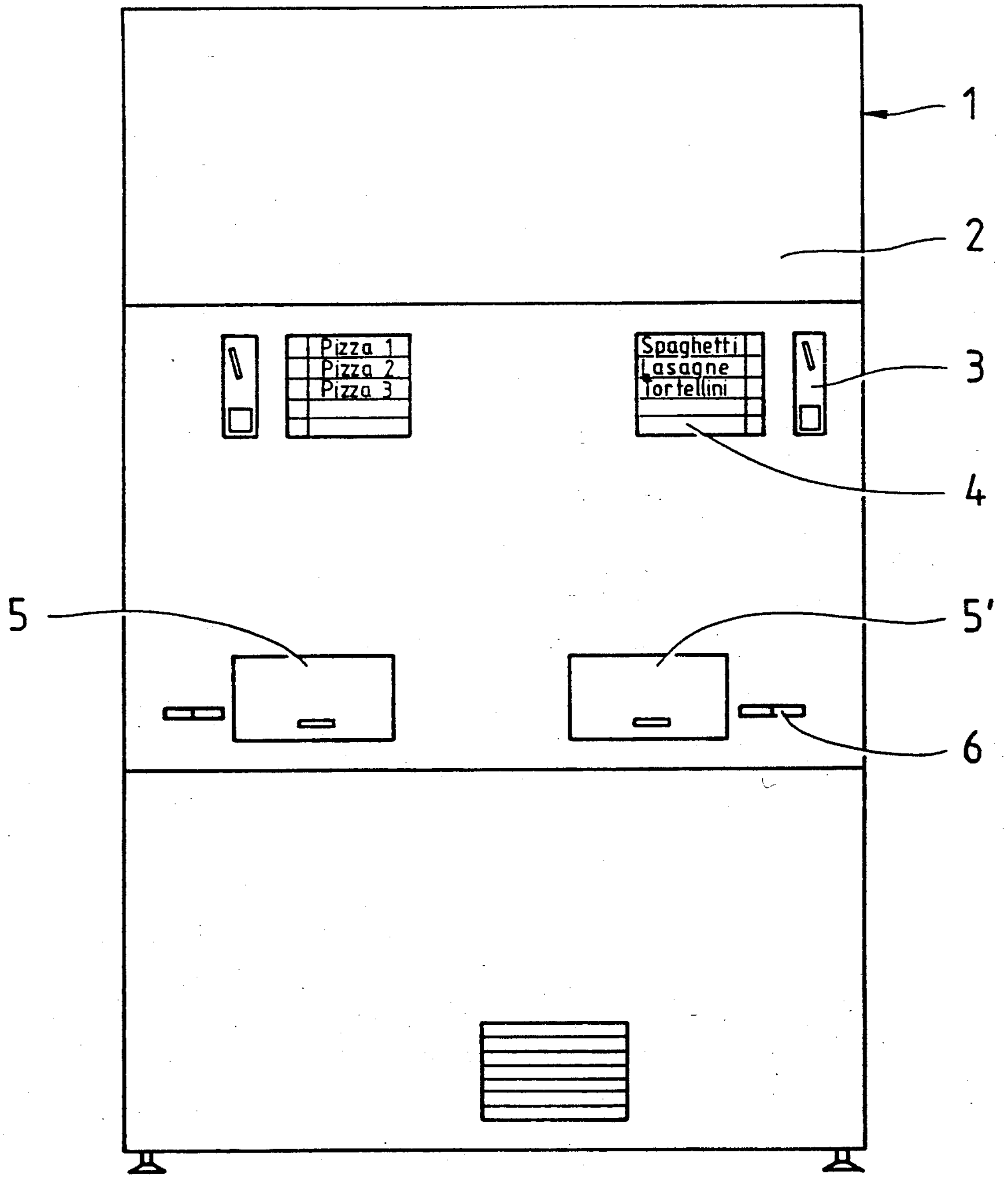
FIG. 1, the frontal face of an automatic food dispenser for the simultaneous discharge of two hot instant meals.

The automatic food dispenser shown in FIG. 1 as seen by the operator includes a housing 1 that is closed on all sides. In its front 2, operating elements are inserted, namely two coin slots 3 and fields of selection keys 4. Associated with each operating element is a discharge opening 5 and 5', respectively, for the desired instant meal and a double removal slot 6 for the discharge of packaged cutlery sets.

Figure 2:
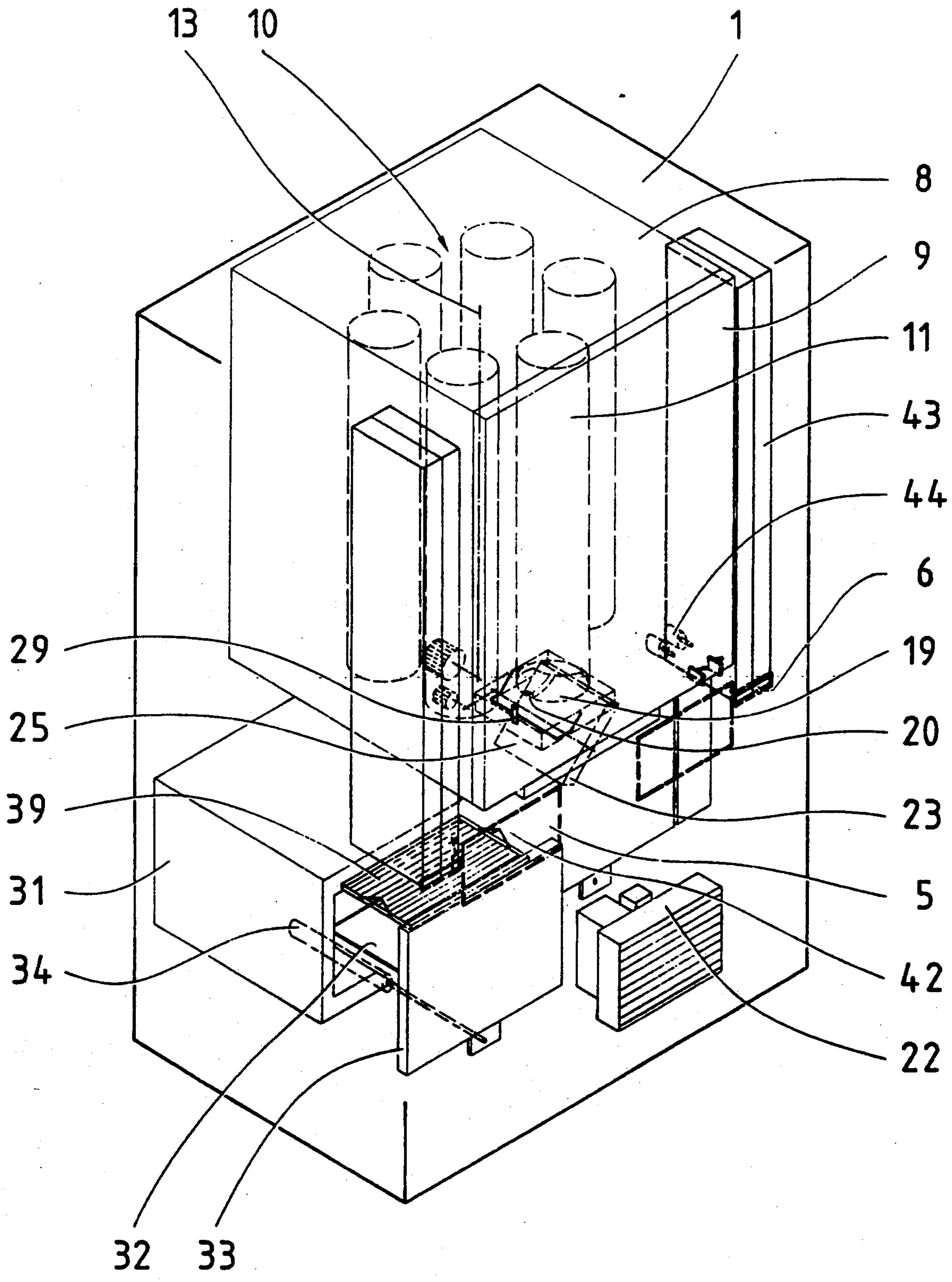
FIG. 2, an elementary perspective view of the automatic food dispenser of FIG. 2.
Figure 3:
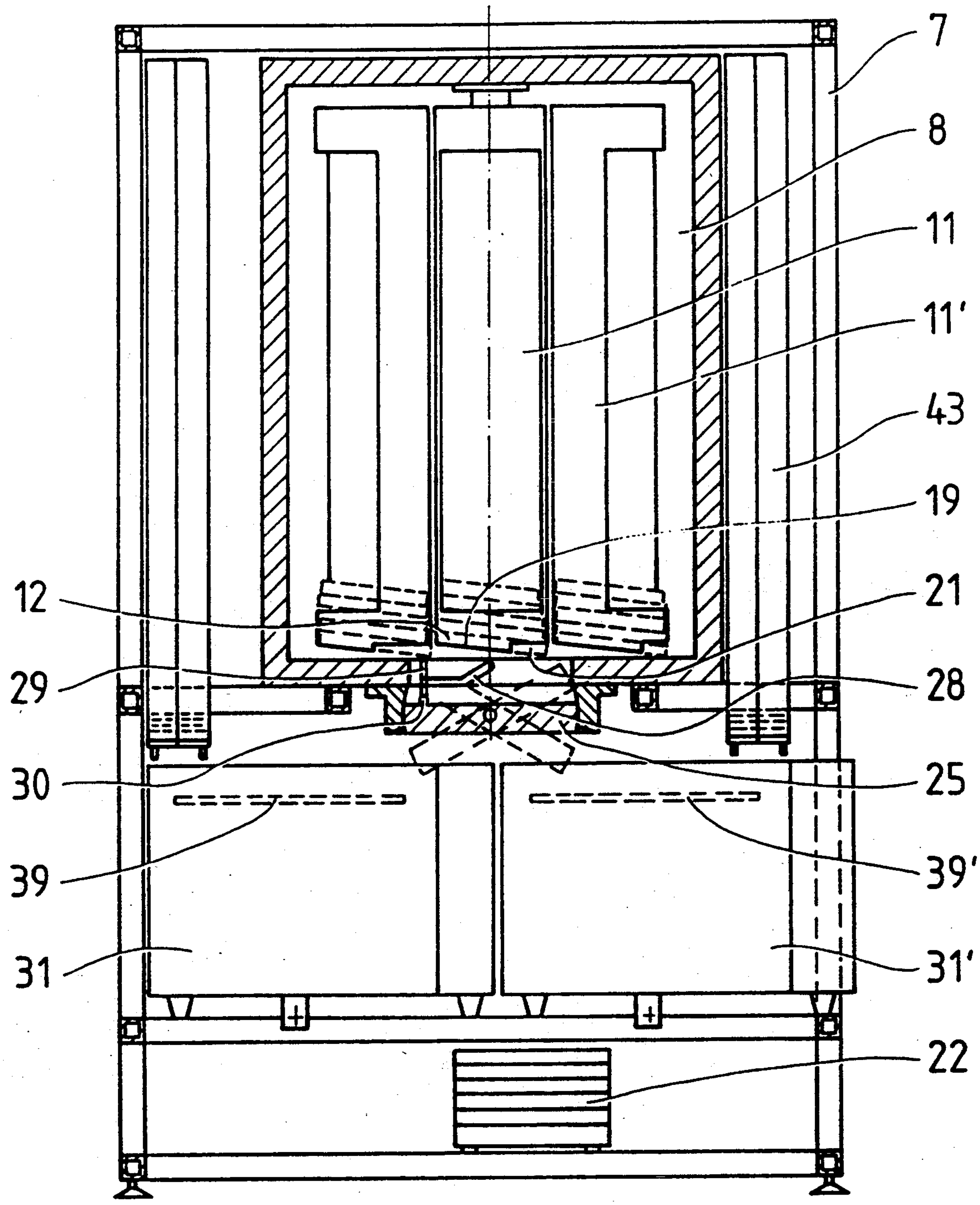
FIG. 3, a partially sectional front view of the automatic food dispenser of FIG. 1 without housing.
Figure 4:
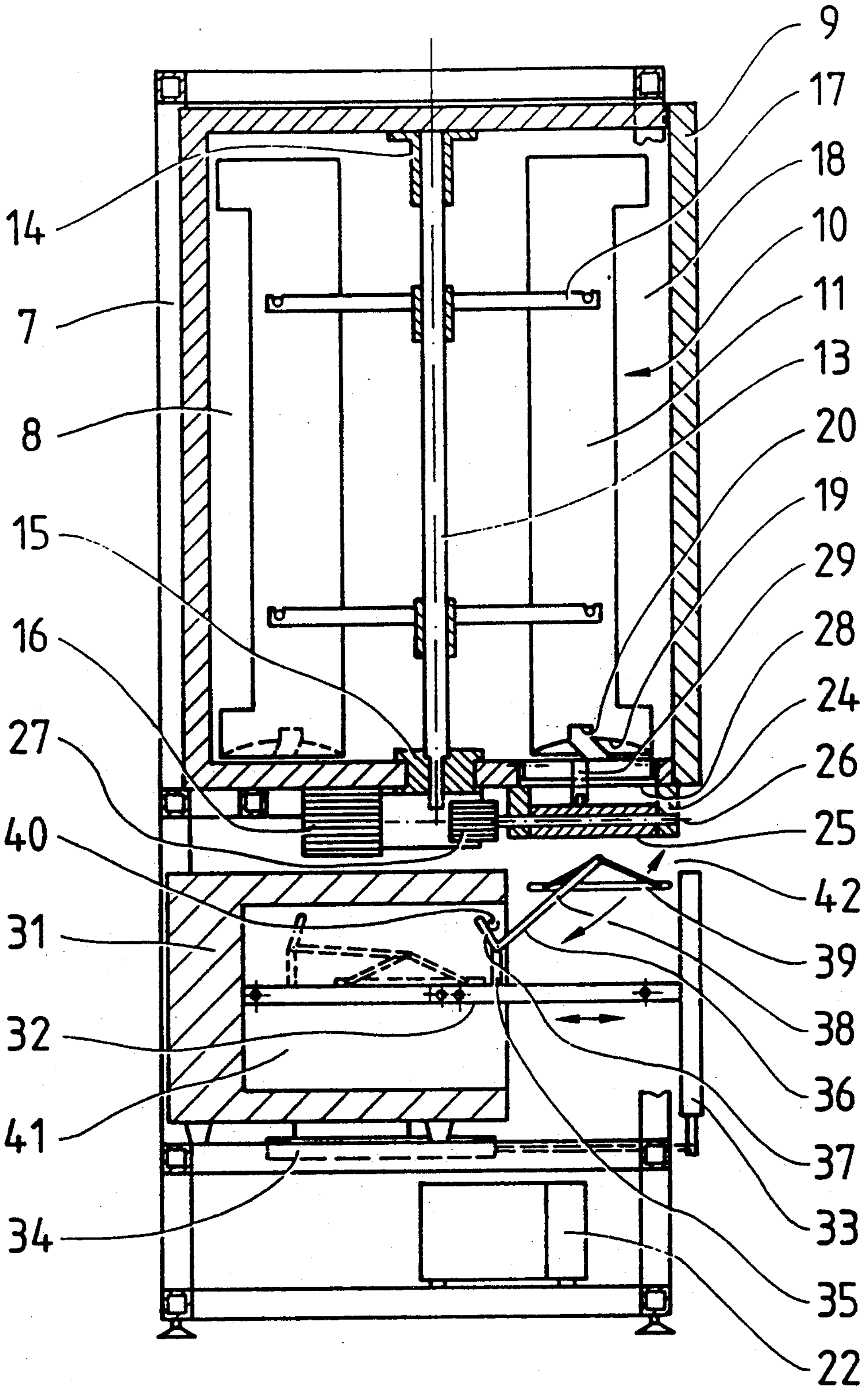
FIG. 4, a partially sectional view from the side of the automatic food dispenser of FIG. 3.

As can be seen in FIGS. 2, 3 and 4, housing 1 includes a frame 7 in whose upper portion a refrigeration chamber 8 is disposed. The interior of refrigeration chamber 8 is accessible to authorized maintenance personnel through a door 9 that opens toward the front.

Refrigeration chamber 8 is composed of a drum-type storage container 10 that includes six tubular magazines 11 which are arranged on a circle and each accommodate a stack of frozen instant meals 12. Drum-type storage container 10 is mounted in an upper pivot bearing 14 and a lower pivot bearing 15 so as to pivot about a vertical rotation axis 13. By means of a drive motor 16 acting on rotation axis 13, drum-type storage container 10 can be caused to rotate, thus moving tubular magazines 11 on a circular path. The individual tubular magazines 11 are suspended from mounts 17 that are radially fastened to rotation axis 13 so that they can be easily removed for maintenance purposes. The walls of tubular magazines 11, which have a circular cross section, are provided with radially outwardly oriented cutouts 18 through which the instant meals 12 can be inserted for storage once the front 2 and the door 9 of refrigeration chamber 8 are opened.

At their lower ends, tubular magazines 11 are provided with a support bottom 19 on which rests the stack of instant meals 12. Ejection slots 20, curved to correspond to the circular path on which the tubular magazines 11 travel, penetrate the support bottoms 19. Lateral ejection openings 21 serve to eject the respective lowermost instant meal 12.

A refrigeration unit 22 disposed in the lower portion of frame 7 maintains the required low storage temperature within refrigeration chamber 8.

A rectangular opening 23 is provided in the underside of refrigeration chamber 8 to be followed downward by a removal chute 24. A closing flap 25 closes removal chute 24 and thus refrigeration chamber 8 toward the bottom in a cold-insulated manner. Closing flap 25 can be pivoted to both sides about its center axis 26. By means of an electrical servomotor 27, closing flap 25 can be selectively pivoted clockwise or counterclockwise.

Above closing flap 25, in the side walls of removal chute 24, a pivot bar 28 is mounted so as to be pivotally movable. Approximately in its center, pivot bar 28 is provided with an ejector 29 which here is configured as a rectangular plate. The lower edge of ejector 29 rests slidingly on the upper side of closing flap 25. In order to reduce friction, the lower end of ejector 29 is provided with a small roller 30.

Two identical ovens 31 and 31' are arranged in parallel next to one another in the lower portion of frame 7. The heat is generated by way of electromagnetic microwaves. Each oven 31 and 31', respectively, includes a horizontally extendable push frame 32 equipped with a push front 33 which constitutes the oven door. A lifting cylinder 34 serves as the drive for push frame 32. On its right and on its left, push frame 32 is provided with a laterally disposed bearing block 35. A pivot lever 36 equipped with a short lever arm 37 and a long lever arm 38 is pivotally mounted in its associated bearing block 35. At the ends of the long lever arms 38, a cooking tray 39, 39' is freely suspended in the manner of a pendulum so that its planar cooking surface is always horizontal. In the interior of oven 31, a stop 40 is provided both on the right and on the left side and cooperates with the corresponding short lever arm 37 (see FIG. 4).

If oven 31 is closed, that is, push frame 32 and push front 33 are fully retracted, cooking tray 39 is in its lowered cooking position within cooking chamber 41 as shown in dashed lines in FIG. 4. If now push frame 32 is extended toward the front, the fixed stop 40 comes in contact, after a certain length of travel, with the short lever arm 37 that is moved along with the push frame. Upon further extension of push frame 32, this leads to pivot lever 36 being pivoted and the cooking tray 39 suspended therefrom being raised outwardly toward the top. In FIG. 4, cooking tray 39 is shown in solid lines in the loading position. After an instant meal 12 taken from refrigeration chamber 8 has been placed on the cooking surface, push front 33 of oven 31 closes again, causing cooking tray 39 to return to its lowered cooking position within cooking chamber 41 due to the interaction between short lever arm 37 and stop 40 corresponding to the travel performed.

After an instant meal 12 has been heated within oven 31, its push frame 32 again moves upward, causing cooking tray 39 to be automatically raised again. If push frame 32 is extended forward somewhat beyond the position shown in FIG. 4, the cooking tray also moves somewhat further upward in the direction of the arrow until it reaches its discharge position within a discharge chamber 42 slightly below closing flap 25. In this discharge position (not shown), the operator is able to reach through the respective discharge opening 5 (see FIG. 2) into the discharge chamber 42 immediately behind it and remove the hot instant meal directly from the cooking surface 40 of the raised cooking tray 39.

FIG. 2 also shows that cutlery magazines 43 which each accommodate a stack of packaged sets of disposable cutlery are disposed on the left and on the right in housing 1. These cutlery magazines 42 are provided with electrically actuated discharge slides 44 by means of which the respective lowermost set of disposable cutlery is pushed forward out of the respective cutlery magazine 43 so that the operator can grasp it through the associated removal slot 6 in front 2.

The separation and removal of a frozen instant meal 12 from refrigeration chamber 8 and its placement onto cooking tray 39 will now be described with reference to FIGS. 5*a* to 5*f*.

Figure 5A:
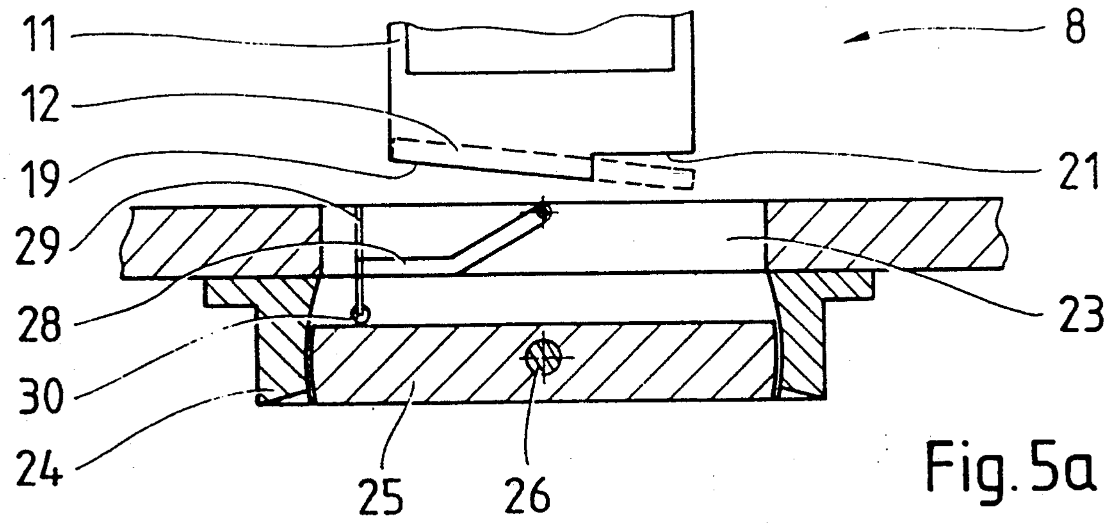
FIGS. 5*a* to 5*f*, the removal of an instant meal from the refrigeration chamber of the automatic food dispenser.

In FIG. 5*a*, closing flap 25 is in its horizontal rest position in which it seals the removal chute 24 in a cold-insulated manner toward the bottom. Ejector 29 and its roller 30 lie loosely on the upper face of closing flap 25. Pivot bar 2 carrying ejector 29 is also disposed in its horizontal rest position. A tubular magazine 11 is disposed vertically above opening 23 in the underside of refrigeration chamber 8 and thus also directly above closing flap 25. The lowermost frozen instant meal 12 rests on the slightly sloped support bottom 19 of tubular magazine 11 and its side already projects slightly out of ejection opening 21.

Figure 5B:
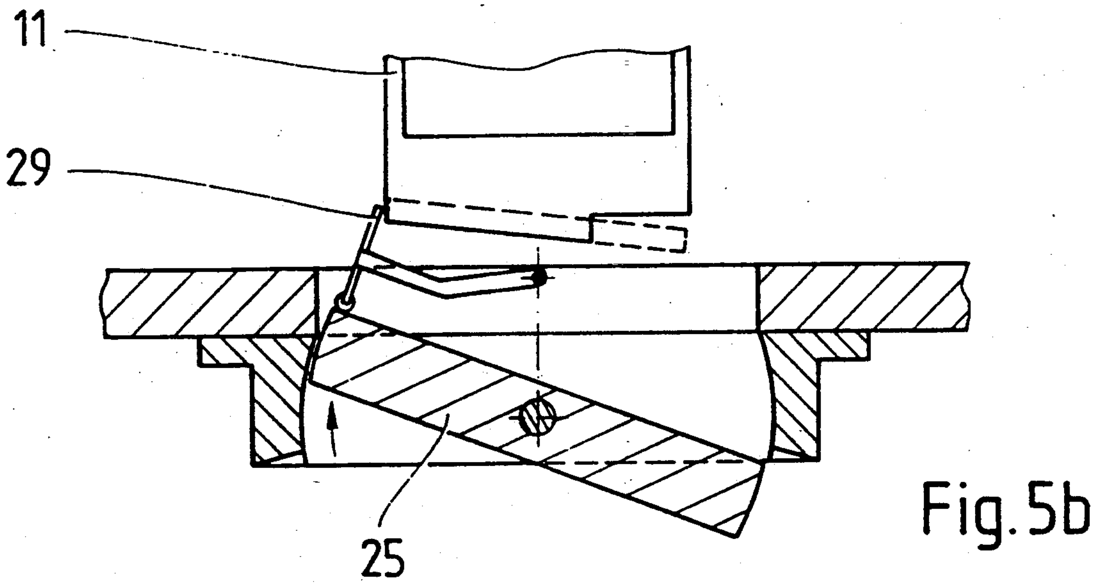

The removal process is now initiated by clockwise rotation of closing flap 25 about approximately 20 angular degrees as shown in FIG. 5*b*. This automatically also pushes pivot bar 28 and ejector 29 upward in the direction of tubular magazine 11.

Figure 5C:
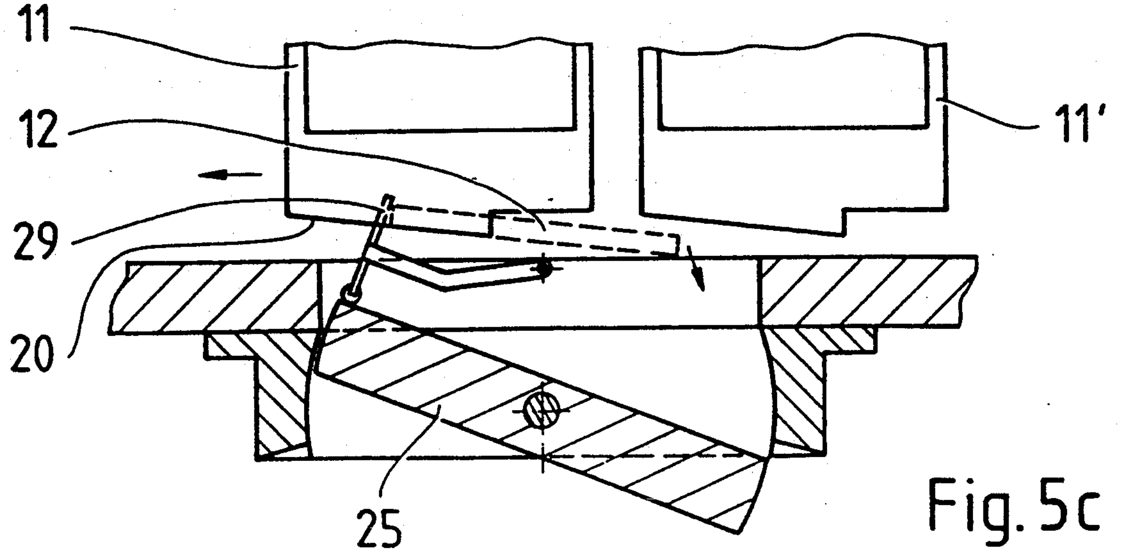
Figure 5D:
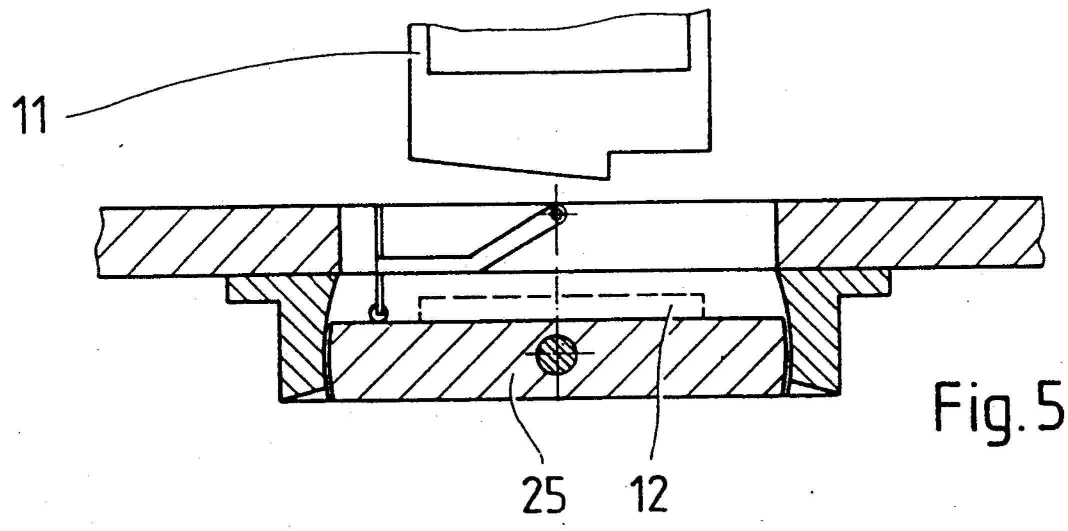

In the next process step shown in FIG. 5*c*, tubular magazine 11 is moved by slowly rotating drum-type storage container 10 on its predetermined circular path in the direction of the arrow. This brings the upper portion of ejector 2 in finger-like engagement with ejection slot 20 in support bottom 19. Due to the relative movement between tubular magazine 11 and stationary ejector 29, instant meal 12 begins to be pushed laterally out of ejection opening 21. Once tubular magazine 11 has been moved far enough in the direction of the arrow, the instant meal finally drops from support bottom 19 onto the surface of closing flap 25.

Then (see FIG. 5*d*) closing flap 25 returns to its horizontal rest position. Due to the particular structural configuration of removal chute 24 and the only limited pivoting of closing flap 25 about approximately 20 degrees, the removal of an individual instant meal 12 from tubular magazine 11 could be accomplished without cold air from refrigeration chamber 8 escaping toward the bottom.

Figure 5E:
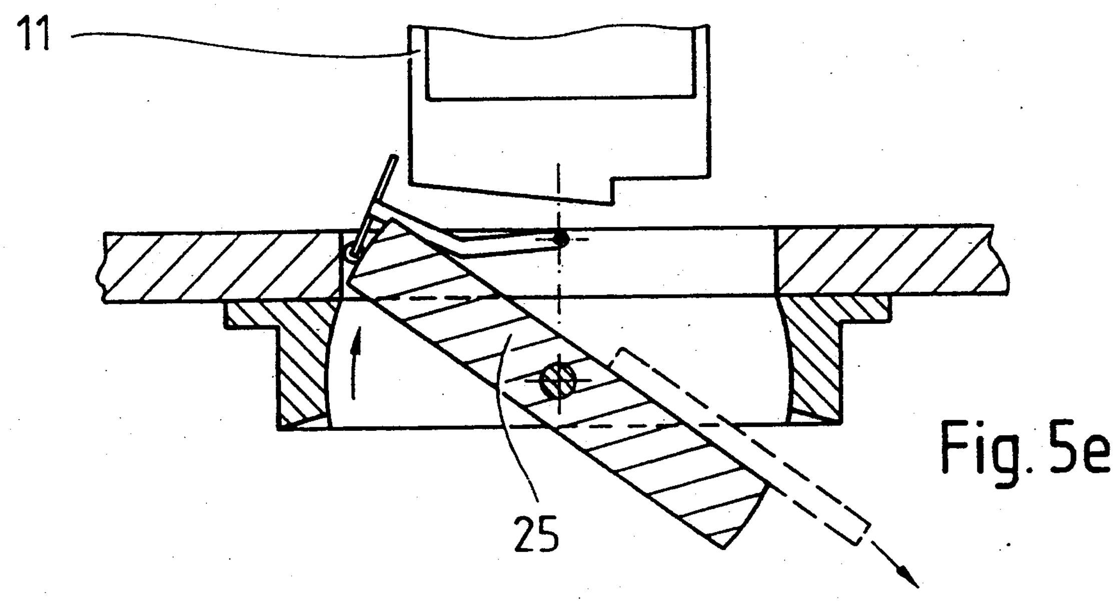
Figure 5F:
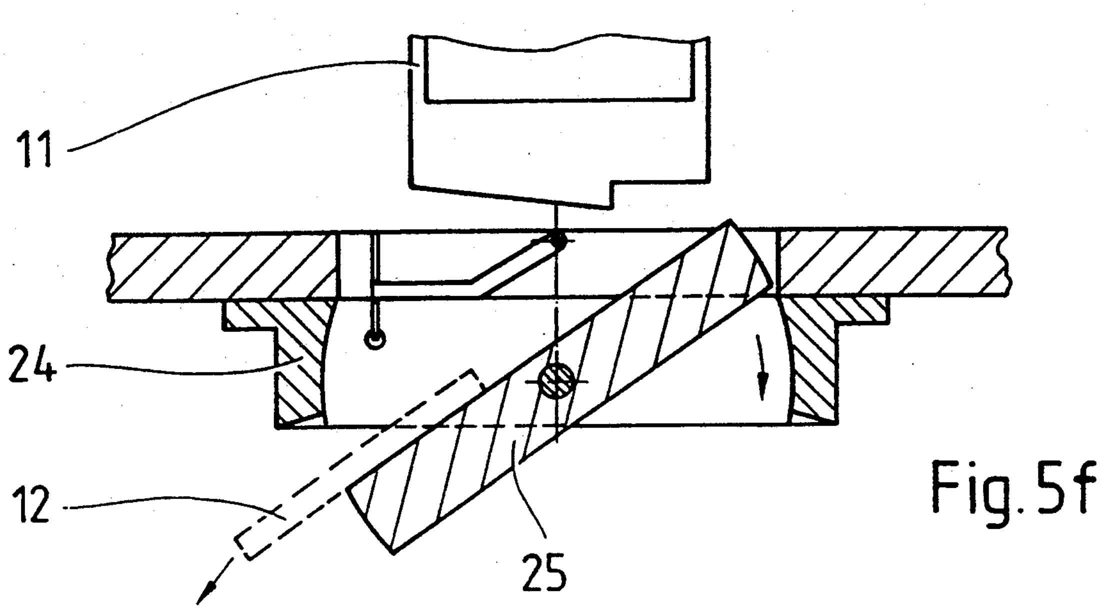

The actual discharge of the selected instant meal 12 from refrigeration chamber 8 is now effected by further pivoting of closing flap 25, with the rotation angle about center axis 26 now being larger, however, and amounting to about 30 degrees. As can be seen in FIG. 5*e*, a slit thus opens between the lower edge of removal chute 24 and the upper face of the pivoted closing flap 25 through which the instant meal 12 is able to slide obliquely downward. Depending on the direction in which closing flap 25, which is disposed in the middle between the two ovens 31 and 31', is pivoted, the instant meal slides toward the right (FIG. 5*e*) or toward the left (FIG. 5*f*). Closing flap 25, which is pivotal about its center axis 26 in the same manner in both directions, thus constitutes a switch with which an individual instant meal 12 can be selectively supplied to the cooking tray 39 of the left oven 31 or to the cooking tray 39' of the right oven 31' (see FIG. 3).

At the end of the above-described removal and supply cycle, the closing flap returns to its horizontal closing position as shown in FIG. 5*a*.

The control and coordination in time of drive motor 16 which causes drum-type storage container 10 to rotate, of servomotor 27 which pivots closing flap 25, of lifting cylinder 34 for opening oven 31 and 31', respectively, and of discharge slides 44 at cutlery magazines 43 is effected by means of an electronic control unit (not shown in the drawings) which also includes a control for maintaining the correct heating times.

Figure 6:
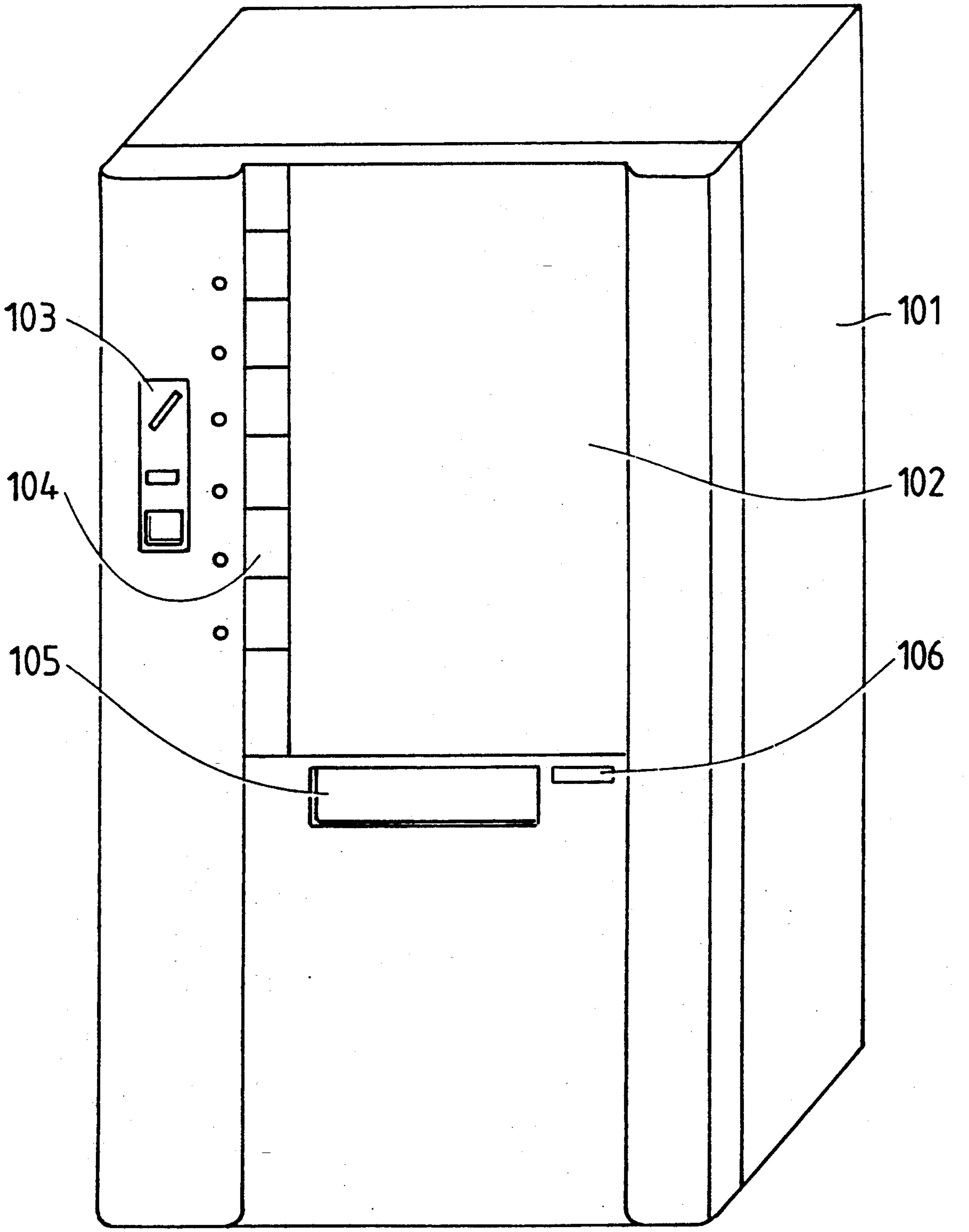
FIG. 6, a perspective exterior view of the housing of an automatic food dispenser for the discharge of only a single instant hot meal at a time.

FIG. 6 shows the closed housing 101 of an alternative embodiment of the automatic food dispenser which differs from the above-described automatic dispenser primarily in that it includes only a single oven and thus is able to discharge only a single hot instant meal at any one time. Accordingly, only a single coin slot 103 and one field with selection keys 104 are provided in front 102. There is also only a single discharge opening 105 for the desired instant meal and next to it a single discharge slot 106 for cutlery.

Figure 7:
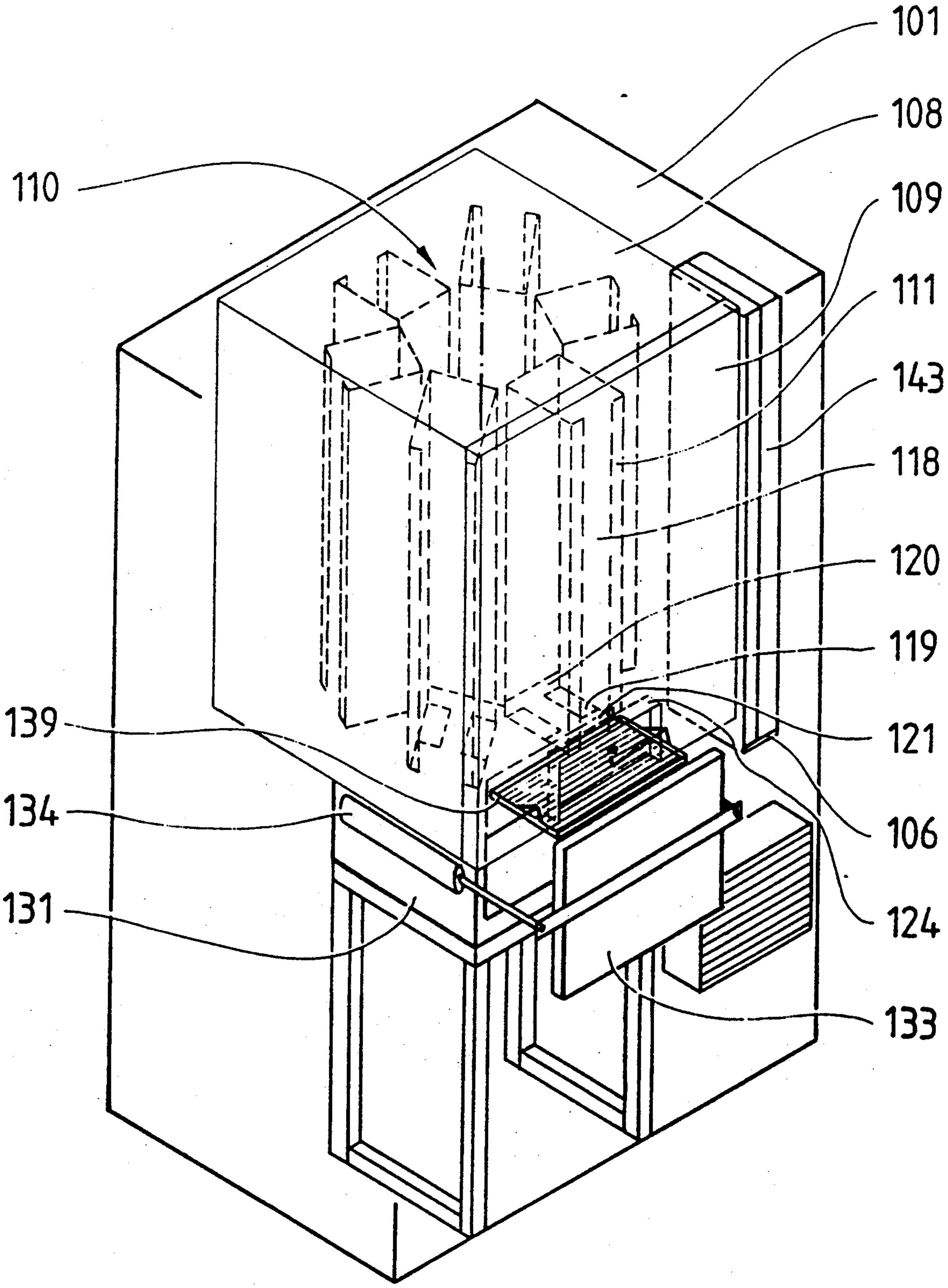
FIG. 7, an elementary perspective view of the automatic food dispenser according to FIG. 6.
Figure 8:
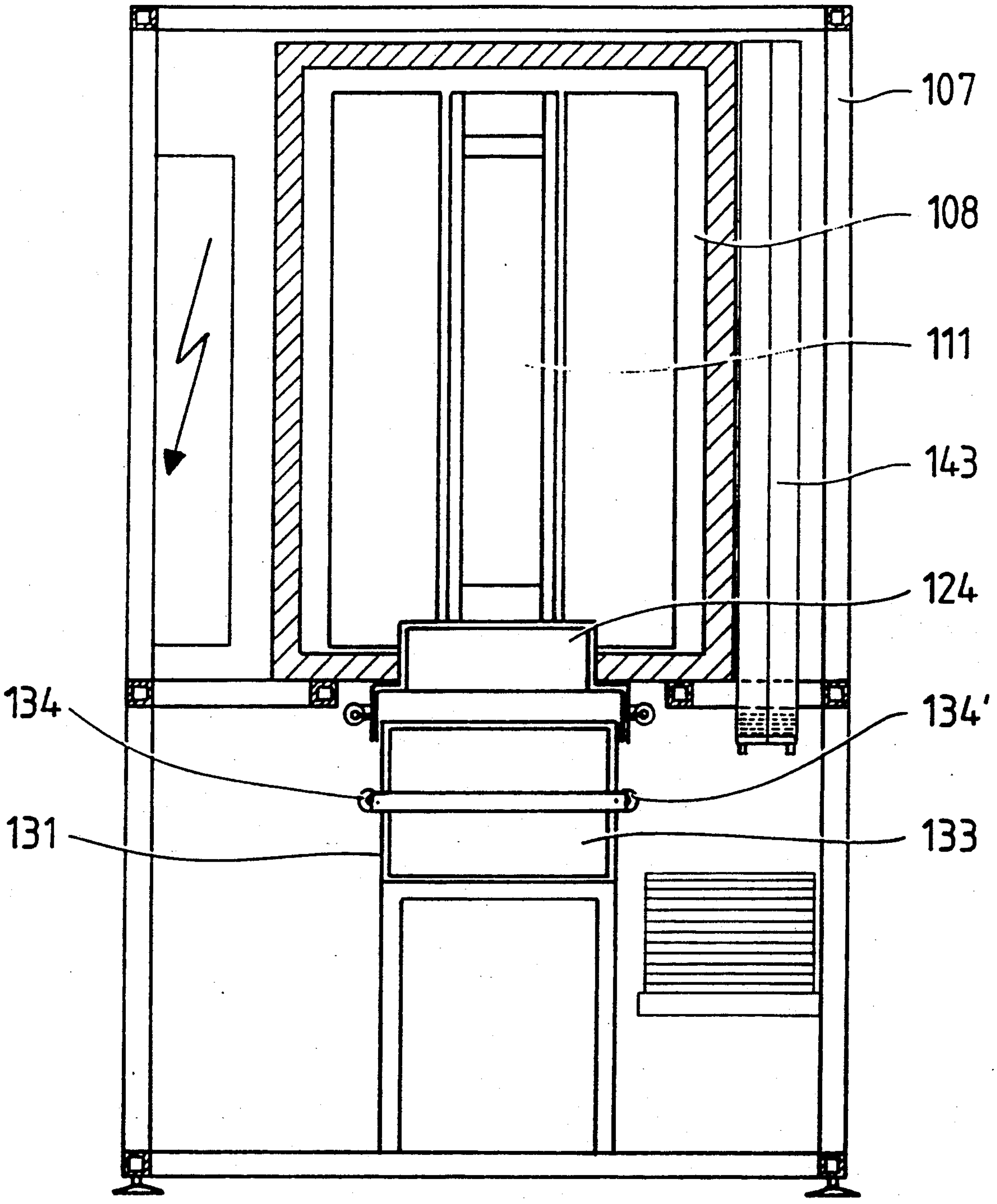
FIG. 8, a partially sectional view from the front of the automatic food dispenser of FIG. 7 without housing.
Figure 9:
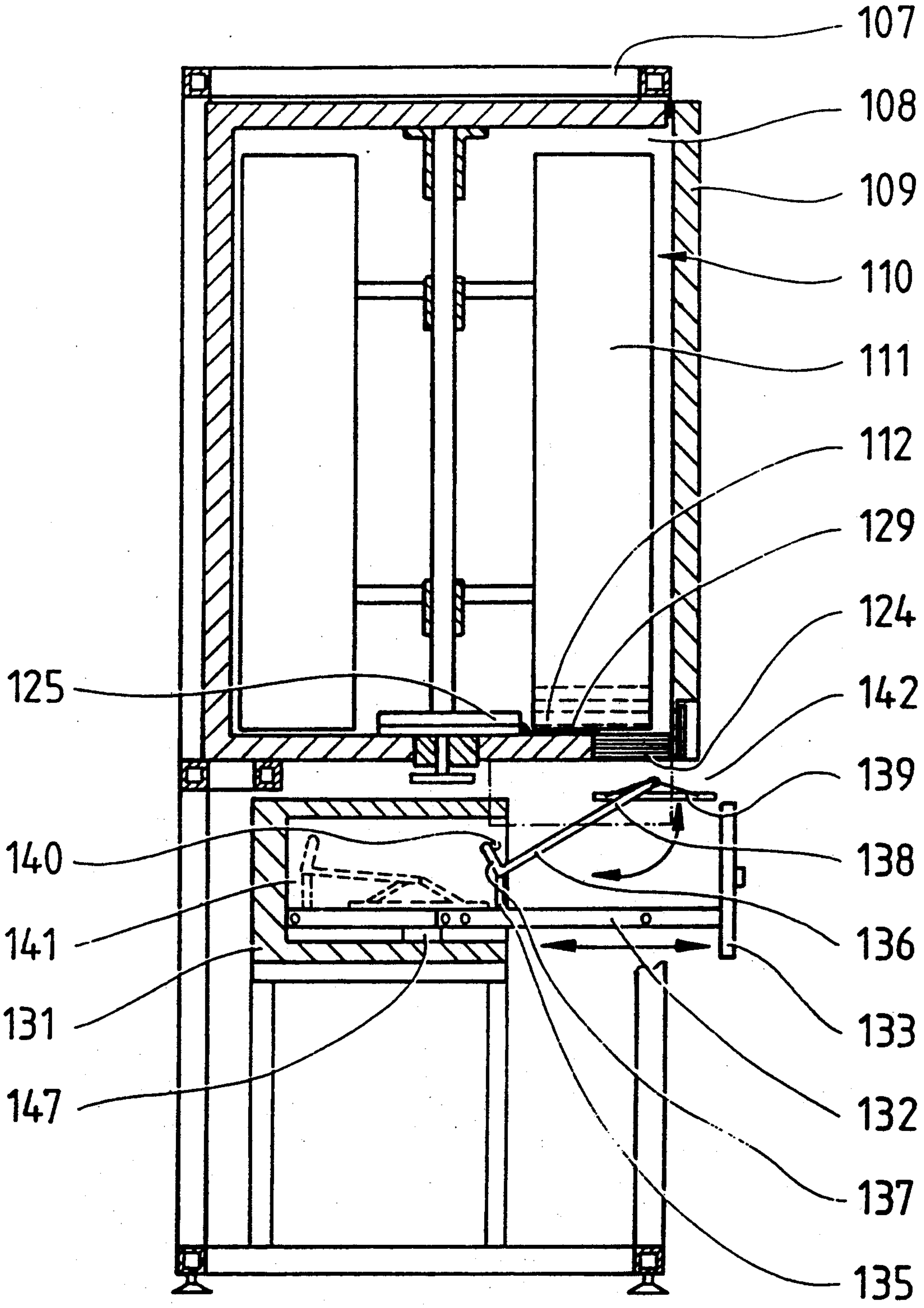
FIG. 9, a partially sectional view from the side of the automatic food dispenser according to FIG. 8.

According to FIGS. 7, 8 and 9, housing 101 includes a frame 107 whose upper portion accommodates a refrigeration chamber 108 which has a door 109 that opens toward the front.

Figure 11:
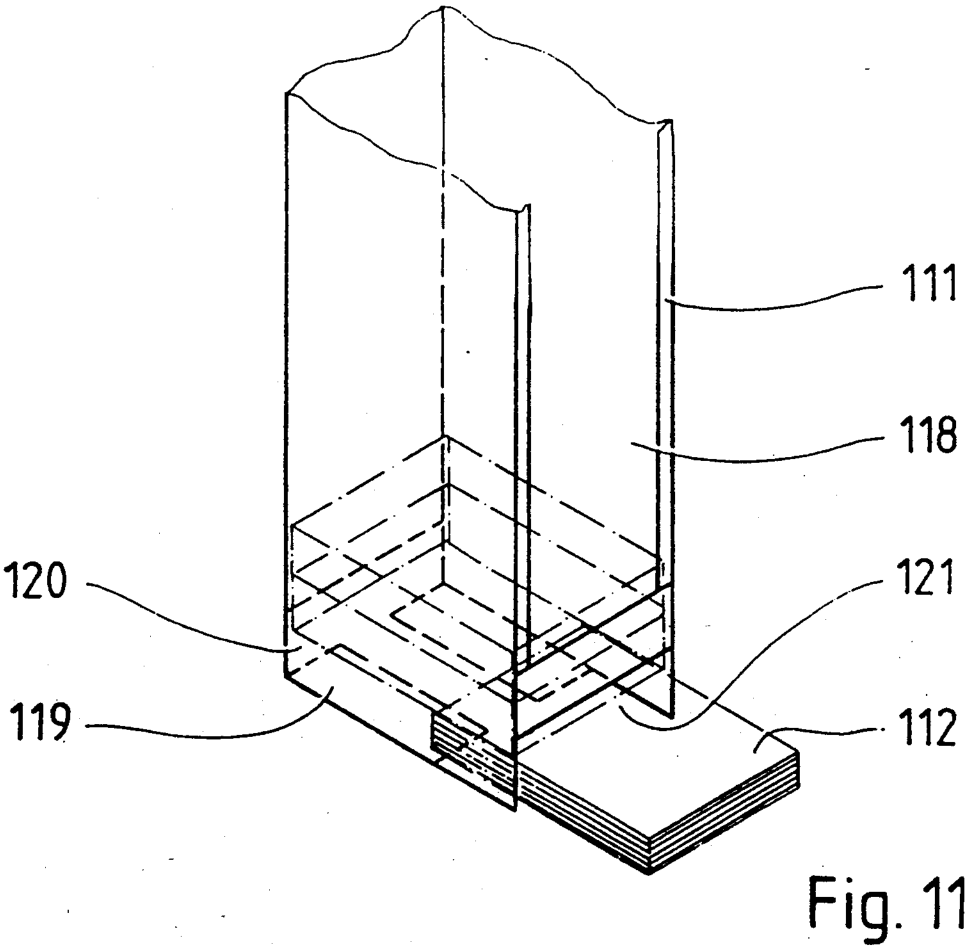
FIG. 11, a perspective view of a tubular magazine of the automatic food dispenser of FIG. 7.

Within refrigeration chamber 108, a rotatable drum-type storage container 110 is disposed which includes six tubular magazines 111, 111' that are arranged on a circle and serve to accommodate frozen instant meals 112. The walls of tubular magazines 111, 111', which have a rectangular cross section, are provided with radially outwardly oriented cutouts 118 through which the instant meals 112 can be inserted. In their rear faces, tubular magazines 11 have a radially inwardly oriented recess 120; at the oppositely disposed frontal faces, radially outwardly oriented ejection openings 121 are provided for the ejection of the respective lowermost instant meal 112 (see FIG. 11).

A rectangular opening 123 (see FIG. 10*b*) is provided in the underside of refrigeration chamber 108 it is closed by a sliding door 124. By means of laterally attached lifting cylinders, sliding door 124 can be extended forward in a horizontal direction to expose opening 123. A movable discharge slide 125 is coupled with sliding door 124 by way of an U-shaped pull frame 126. For this purpose, long holes 127 and 127', respectively, are provided in the free legs of pull frame 126 into which engage sliding pins 128, 128' disposed on the interior face of sliding door 124. The front edge of discharge slide 125 is provided with a pivotally articulated pivot plate which here has a rectangular cross section.

In this modified embodiment of the automatic food dispenser, only one oven 131 is disposed in the lower portion of frame 107. In the same manner as in the above-described automatic food dispenser having two parallel ovens 31, 31' (see FIG. 3), oven 131 includes a horizontally extendable push frame 132 having a push front 133 which forms the oven door. Parallel lifting cylinders 134, 134' arranged to both sides of microwave oven 131 serve as the drive for the push frame. On its right and left, push frame 132 is provided with a laterally disposed bearing block 135. A pivot lever 136 having a short lever arm 137 and a long lever arm 138 is mounted in the associated bearing block 135 so as to be pivotally movable. A cooking tray 139 is suspended in a pendulum fashion from the ends of the long lever arms 138 in such a manner that its planar cooking surface is always horizontal. In the interior of oven 131, a stop 140 is provided on the right and left side and cooperates with the corresponding short lever arm 137 (see FIG. 9). Opening and closing of oven 131 and the automatic raising and lowering of cooking tray 139 connected therewith is effected in the same manner as in the first described embodiment of the automatic food dispenser. After heating in cooking chamber 141 of oven 131, cooking tray 139 moves the hot instant meal into discharge chamber 142 behind discharge opening 105 (see FIG. 6).

FIG. 7 further shows that a cutlery magazine 143 to accommodate sets of disposable cutlery is disposed on the right side in the interior of housing 101. Together with each hot instant meal, a suitable set of disposable cutlery is discharged through removal slot 106 in front 102.

A turntable 145 disposed on cooking tray 139 serves to provide uniform heating in oven 131 and is connected with a flat drive disc 146 disposed coaxially at the underside of cooking tray 139. At the bottom of oven 131, an electrical rotary drive 147 is provided. When cooking tray 139 is lowered into the cooking position, drive disc 146 comes in engagement with rotary drive 147 so that turntable 145 is caused to rotate slowly during operation of microwave oven 131. This heats the instant meal more uniformly.

The separation and removal of a frozen instant meal 112 from refrigeration chamber 108 and its transfer to cooking tray 139 will now be described with reference to FIGS. 10*a* and 10*b*.

Figure 10A:
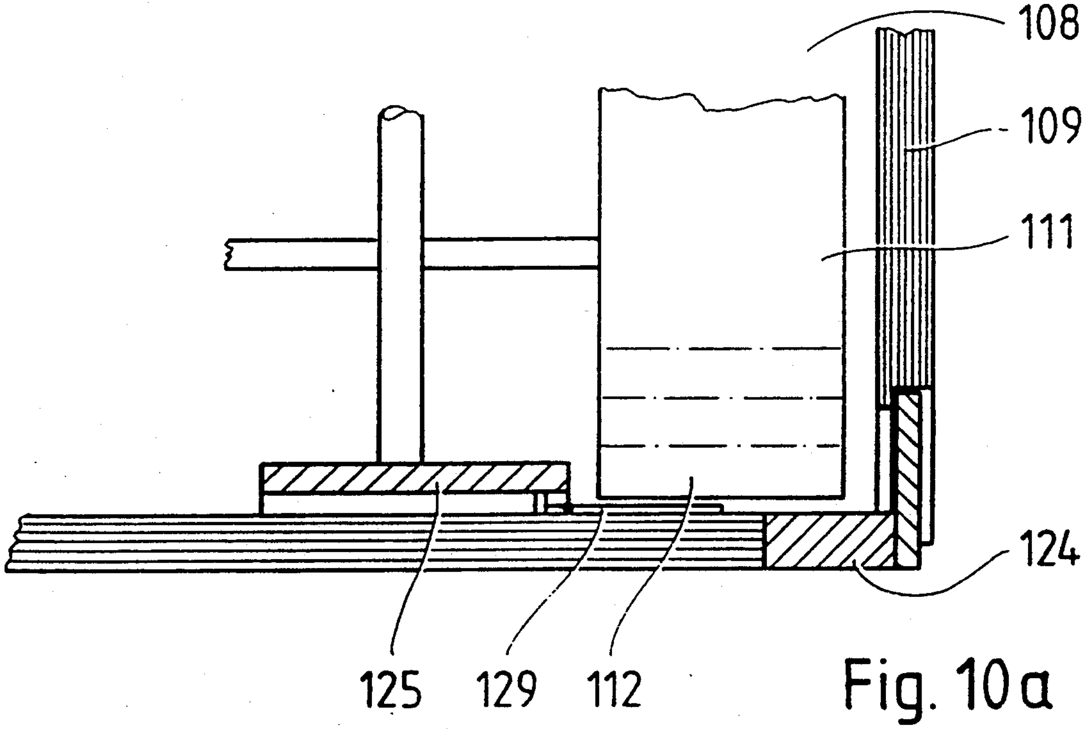
FIGS. 10*a*, 10*b*, a partially sectional side view to an enlarged scale of part of the refrigeration chamber and the removal device of the automatic food dispenser according to FIG. 9 with the sliding door closed and open, respectively.

In FIG. 10*a*, the sliding door 124 of refrigeration chamber 108 is closed. Discharge slide 125 is in its rest position outside of tubular magazine 111. The lowermost frozen instant meal 112 rest on the support bottom 119 of tubular magazine 111. Pivot plate 129 at the front edge of discharge slide 125 rests at the bottom of refrigeration chamber 108.

Figure 12:
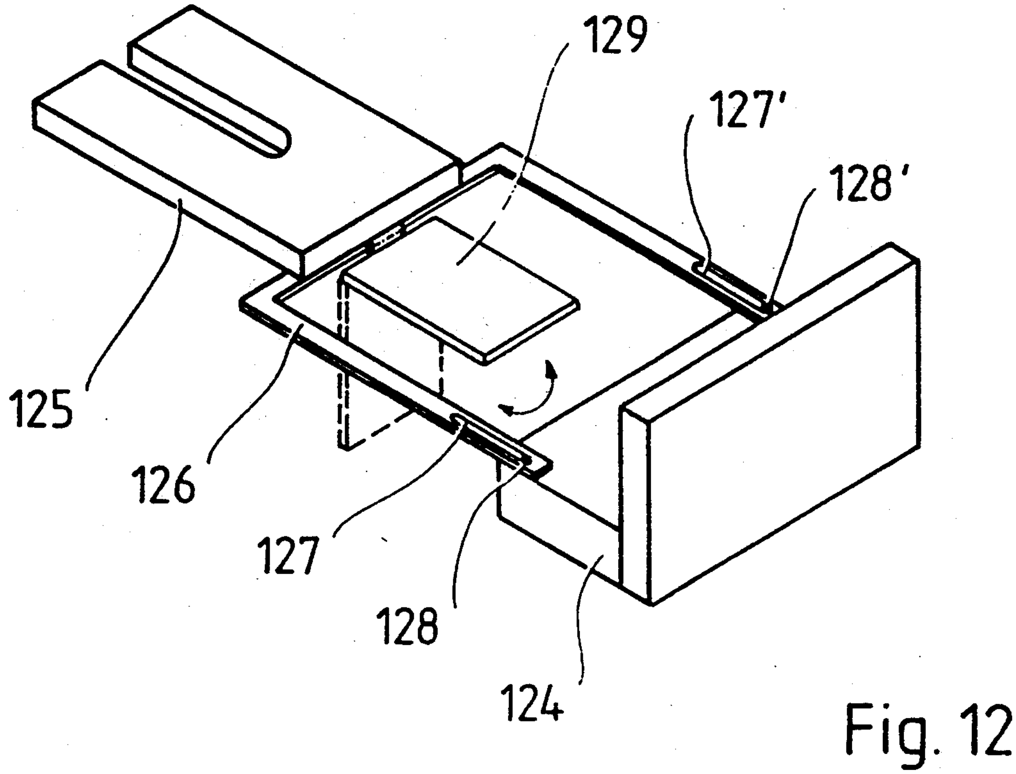
FIG. 12, a perspective illustration of the removal device of the automatic food dispenser according to FIGS. 9, 10*a* and 10*b*.

The removal process is now initiated by the horizontal movement of sliding door 124. Discharge slide 125 still remains in its rest position since—see FIG. 12—slide pins 128, 128' at sliding door 124 initially slide in the long holes 127, 127' of pull frame 126 which is connected with discharge slide 125.

When sliding door 124 opens further, slide pins 128, 128' reach the front ends of long holes 127, 127' (see FIG. 12) so that from this moment on sliding door 124 carries along, by way of the coupled-on pull frame 126, discharge slide 125 together with a pivot plate 129 articulated thereto. This causes discharge slide 125 to move radially through recess 120 into the interior of tubular magazine 111 and to push the lowermost instant meal 112 out toward the front.

Figure 10B:
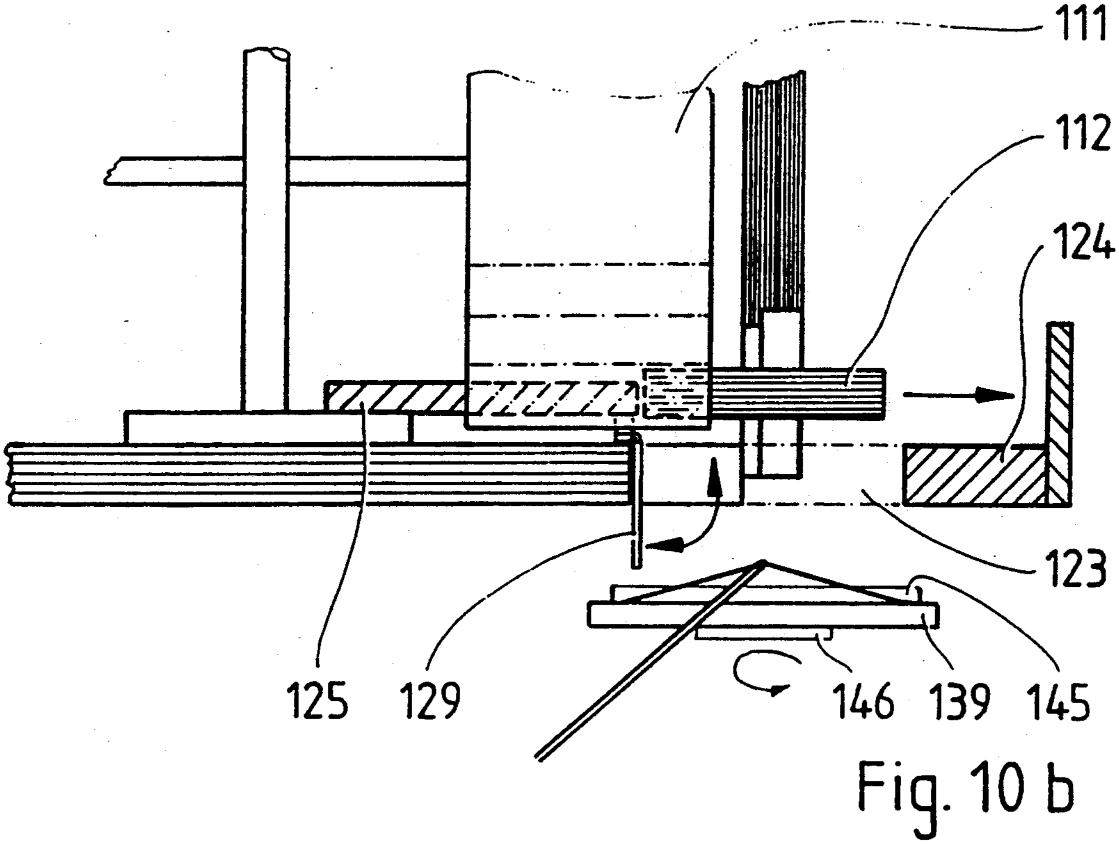

In FIG. 10*b*, sliding door 124 is almost fully open. Discharge slide 125 has almost reached its foreward end position. At this moment, pivot plate 129 flips downward about 90 degrees and suddenly releases opening 123. The instant meal 112 pushed out of tubular magazine 111 is now able to drop downward in a flat orientation through opening 123 onto turntable 154 of cooking tray 139.

At the end of the above-described removal cycle, sliding door 124 returns to its horizontal closing position shown in FIG. 10*a*. This also causes discharge slide 125 and pivot plate 129 fastened thereto to move back into their starting positions.

It will be understood that the above description of the present invention is susceptible to various modifications, changes and adaptations, and the same are intended to be comprehended within the meaning and range of equivalents of the appended claims.

What is claimed is:

1. An automatic food dispenser for dispensing hot instant meals, the dispenser comprising:
- a housing including a front in which operating elements are provided;
- a refrigeration chamber for storing a supply of refrigerated, packaged instant meals;
- at least one oven including a cooking chamber disposed underneath the refrigeration chamber for accommodating a refrigerated instant meal, an oven door provided with an opening mechanism and a movable cooking surface coupled mechanically with the oven door;
- an electromechanical removal device provided at the underside of the refrigeration chamber which removes a single instant meal from the refrigeration chamber and, with the oven door open, moves it onto the cooking surface;
- at least one discharge chamber accessible to the operator for discharge of the hot instant meal; characterized in that;
- a drum-type storage container which is rotatable about a vertical rotation axis is provided within the refrigeration chamber and comprises a plurality of tubular magazines arranged on a circle each accommodating a stack of refrigerated instant meals;
- the oven includes a horizontally extendable push frame which has a push front forming the oven door:
- a cooking tray having a horizontal cooking surface is mounted on the push frame to be raised and lowered in such a manner that, when the push frame is pulled out, the cooking tray is moved upward from a lowered cooking position within the cooking chamber into a loading position outside of the cooking chamber and, once the push frame is pulled out fully, the cooking tray is moved further upward into a discharge position within the discharge chamber;
- a movable closing member for the refrigeration chamber is provided below the tubular magazines and above the cooking tray in the loading position;
- the discharge chamber is disposed behind a discharge opening in the front of the housing.

2. An automatic food dispenser according to claim 1, characterized in that the removal device includes a pivotal closing flap as the closing member for the refrigeration chamber which is disposed below the circle of tubular magazines and above the cooking tray in the loading position.

3. An automatic food dispenser according to claim 2, characterized in that
- two identical ovens are provided next to one another;
- the closing flap is disposed in the middle between the two ovens and is pivotal to both sides about its center axis;
- each oven has an associated discharge chamber with discharge opening.

4. An automatic food dispenser according to claim 2, characterized in that
- the tubular magazines each include a support bottom for the stack of instant meals, an ejection slot penetrating the support bottom in the circumferential direction and a lateral ejection opening for the ejection of the respective lowermost instant meal;

in the region of the closing flap, a movable ejector is disposed which in the ejection position engages in the ejection slot of one of the tubular magazines.

5. An automatic food dispenser according to claim 4, characterized in that a pivot bar supporting the ejector is mounted so as to be pivotally movable above the closing flap;

the ejector lies slidingly on the upper face of the closing flap and is pressed by the latter from its rest position upward into the ejection position.

6. An automatic food dispenser according to claim 1, characterized in that the removal device includes as its closure member a sliding door provided in the bottom of the refrigeration chamber and being disposed below the tubular magazines and above the cooking tray in the loading position.

7. An automatic food dispenser according to claim 6, characterized in that the tubular magazines each include a support bottom for the stack of instant meals, a radially outwardly oriented ejection opening for the ejection of the respective lowermost instant meal and a recess disposed immediately above the support bottom and opposite the ejection opening;

a movable discharge slide is provided which, when the sliding door is open, engages in the recess of one of the tubular magazines and pushes the lowermost instant meal through its ejection opening horizontally outwardly.

8. An automatic food dispenser according to claim 7, characterized in that the discharge slide is coupled with the sliding door by way of a pull frame.

9. An automatic food dispenser according to claim 7, characterized in that the front edge of the discharge slide is provided with a pivotally articulated pivot plate which rests on the bottom of the refrigeration chamber and drops vertically downward only if the sliding door is fully opened.

10. An automatic food dispenser according to claim 1, characterized in that the push frame of the oven supports two laterally disposed bearing blocks;

each bearing block is provided with a pivotally mounted two-armed pivot lever having a short lever arm and a long lever arm;

the cooking tray is suspended in a pendulum manner from the ends of the long lever arms;

at least one short lever arm cooperates with a fixed stop in such a manner that the pivot lever pivots upward when the push frame is extended and has traversed a certain distance.

11. An automatic food dispenser according to claim 1, characterized in that a turntable is disposed on the cooking tray;

a flat drive disc is disposed coaxially at the underside of the cooking tray and is connected with the turntable;

an electrical rotary drive is provided within the oven so as to cooperate with the drive disc and cause the turntable to rotate when the cooking tray is lowered to the cooking position.

12. An automatic food dispenser according to claim 1, characterized in that at least one cutlery magazine is disposed within the housing so as to accommodate a stack of packaged disposable cutlery sets;

at least one discharge slot for disposable cutlery is provided at the front of the housing.

13. An automatic food dispenser according to claim 12, characterized in that an electrically actuated discharge slide for the respective lowermost set of disposable cutlery is provided at the cutlery magazine.

* * * * *